United States Patent [19]

Lause et al.

[11] Patent Number: 5,758,976
[45] Date of Patent: Jun. 2, 1998

[54] RUNNING WHEEL

[75] Inventors: Heinz Lause, Recklinghausen, Germany; Vincent Dreyer, Wintzenheim, France

[73] Assignee: Liebherr-France S.A., Colmar Cedex, France

[21] Appl. No.: 818,292

[22] Filed: Mar. 14, 1997

[30] Foreign Application Priority Data

Mar. 15, 1996 [DE] Germany ............... 196 10 230.8

[51] Int. Cl.$^6$ ............................................. F16C 17/02
[52] U.S. Cl. ............................................. 384/129; 384/450
[58] Field of Search ............................. 384/129, 450, 384/154, 286, 902, 294

[56] References Cited

U.S. PATENT DOCUMENTS 5,072,689  12/1991  Nakagawa et al. ................. 384/902
5,232,069  8/1993  Siegrist ................................ 384/286
5,494,135  2/1996  Brackett ............................... 384/154

Primary Examiner—Lenard A. Footland
Attorney, Agent, or Firm—Dilworth & Barrese

[57] ABSTRACT

A running wheel is slidably supported on a stationary axle between the axle and the bearing bore with a large bearing play and a small Hertzian stress. The axle has a circumferential section which is defined by its sector with a sector angle of less than 180°, wherein its radius of curvature is substantially equal to the radius of curvature of the inner wall of the bearing bore. In accordance with the desired bearing play, the radius of curvature of the remaining circumferential section of the axle is smaller than the radius of curvature of the bearing bore. The direction of the main stress acting upon the running wheel lies in the section of the central plane of the axle sector with the larger radius.

2 Claims, 2 Drawing Sheets

RUNNING WHEEL

BACKGROUND OF THE INVENTION

The invention refers to a running wheel rotatably arranged with bearing play on a stationary axle.

When a running wheel is rotatably mounted on a stationary axle, for instance in a bore of the running wheel which normally is lined with a bearing sheel or a bearing bush rotatably connected to the running wheel, during rotation the pressure exerted onto the bearing surface via the axle is constantly applied to the bearing surface. The Hertzian stress effected by said pressure increases with the clearance of the axle in the bearing bore or in the bore of the bearing bush, as the width of the support of the axle in the circumferential direction becomes smaller with increasing play and, thus, also the surface contact between the axle and the bearing shell or the bearing bush becomes smaller. When the clearance becomes greater, the surface contact approximates a line contact.

In known bearings, the bearing play must be kept small in order to reduce the Hertzian stress. But a small bearing play can lead to damages as a result of axle bendings and different extensions by influences of temperature. On the other hand, a larger bearing play results in an increased Hertzian stress at the wall of the bearing bore which can lead to a premature destruction of the bearing.

SUMMARY OF THE INVENTION

Therefore the object of the invention is to slidably mount a running wheel with a large bearing play and a small Hertzian stress on a stationary axle between the axle and the bearing bore.

According to the invention said object is solved in that the axle has a circumferential section which is defined by its sector having a sector angle of less than 180°, in which its radius of curvature is substantially equal to the radius of curvature of the inner wall of the bearing bore, of the bearing bush or of the bearing shell of the running wheel, in that the radius of curvature of the remaining circumferential section of the axle is smaller than the radius of curvature of the bearing bore or of the bearing shell in accordance with the desired bearing play, and in that the main stress direction acting upon the running wheel lies within the section of the central plane of the axle sector with the larger radius.

Thus, the invention consists of a sliding bearing of a running wheel, preferably via a bush or a bearing shell, on a stationary axle, wherein the lower part of the axle lying in the main stress direction has a larger radius corresponding to the inner diameter of the bush in order to increase the contact surface of the axle on the bush and thus to reduce the surface pressure, while the radius of the upper part of the axle is smaller than the radius of the bush so that the desired large clearance is created.

In the bearing according to the invention, the surface contact between the axle and the bearing bore, approximating a line contact and conventionally only caused by a normal strip, is substantially increased so that a surface contact is created over a large circumferential section of the axle whereby the pressure load is greatly reduced. Hence, the bearing according to the invention shows a high operating safety and a long lifetime.

Advantageously, the circumferential section of the axle with the larger diameter corresponds to a sector angle of approximately 70° through 120°.

The running wheel arranged in a bearing in the manner according to the invention can be used with special advantage for heavy constructional machines.

As the bearing according to the invention allows for a large bearing play despite the greatly reduced surface pressure, the bearing may also accomodate larger axle bendings.

BRIEF DESCRIPTION OF THE DRAWINGS

One embodiment of the invention will be explained in detail in the following by means of the drawings, wherein One embodiment of the invention will be explained in detail in the following by means of the drawings, wherein.

DESCRIPTION OF THE PREFERRED EMBODIMENTS

Figure 1:
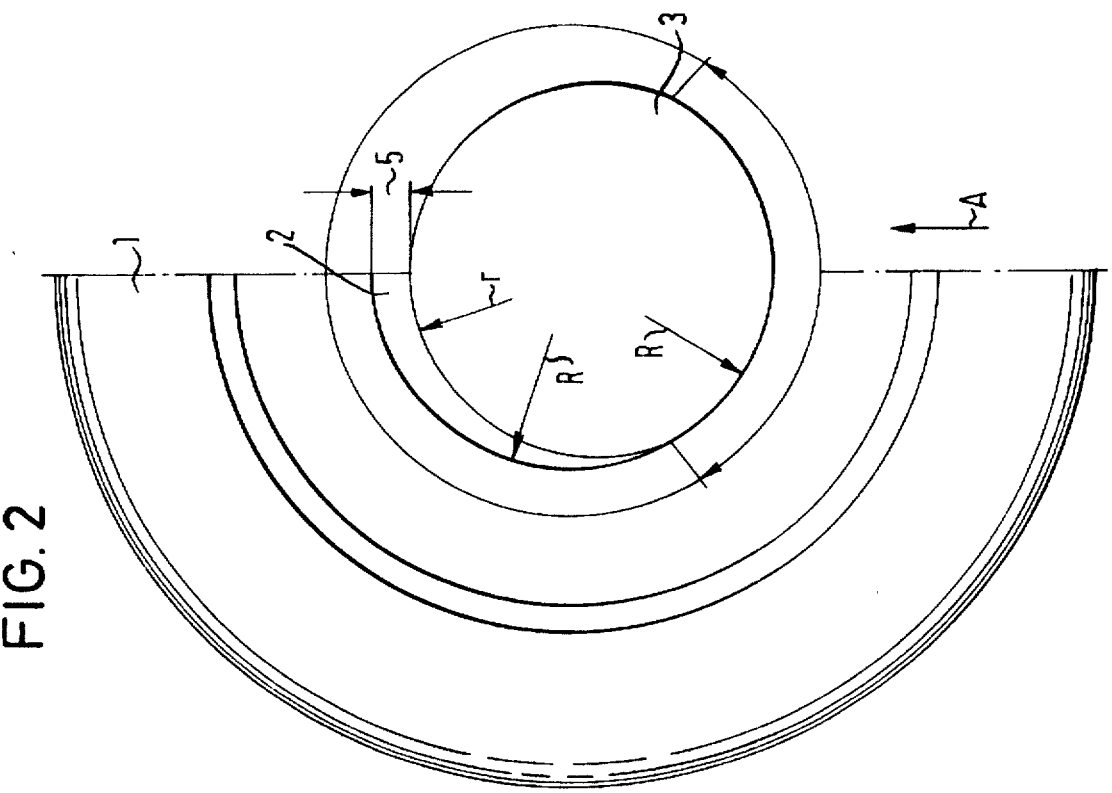
FIG. 1 is a perspective view of a running wheel in a longitudinal section, the running wheel being journaled on a stationary axle.
Figure 2:
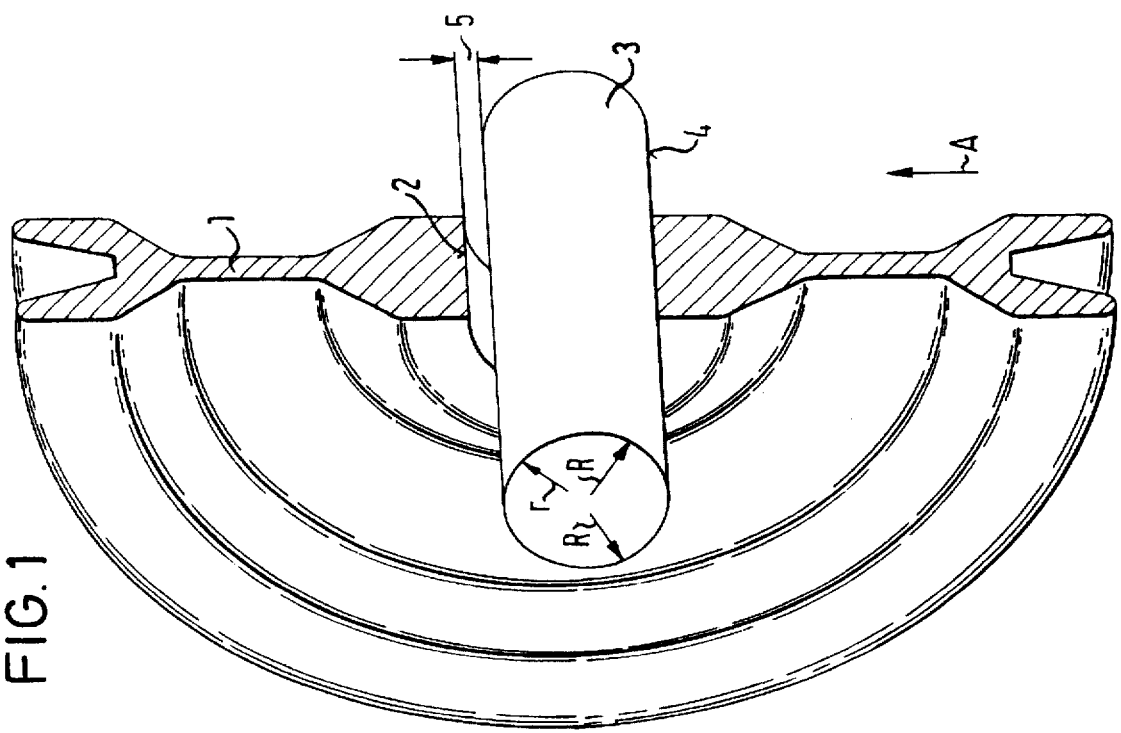
FIG. 2 is a front view of the bearing of FIG. 1.

In FIG. 1 there is illustrated a longitudinal section of a running wheel 1 which is provided with a bearing bore 2 which can also be formed by the bore of a bearing bush which is rotatably fixed in a bore of the running wheel 1. The running wheel 1 is rotatably mounted on a stationary axle 3 via its bearing bore 2. By a (not shown) means, the running wheel 1 is held immovably on the axle 3 in the axial direction. The main stress direction acting upon the running wheel 1 is shown by arrow A. Thus, the running wheel 1 is respectively supported via the lower section of the rotating wall of the bearing bore 2 on the lower section of the stationary axle 3.

The stationary axle 3 has a lower section 4 with a larger radius R which substantially corresponds to the radius of the bearing bore 2. The stationary axle 3 is also provided with an upper portion where it has a smaller radius of curvature r. Due to said smaller radius of curvature r, a large bearing play is created which is indicated by arrow 5. The circumferential section of the stationary axle 3 with the smaller radius of curvature r is larger than the lower circumferential section with the larger radius of curvature R. Since the lower section of the stationary axle 3 with the larger radius of curvature R has substantially the same radius of curvature R as the bearing bore 2, in its lower part 4 the axle 3 rests upon the wall of the bearing bore 2 with its entire surface.

Figure 3:
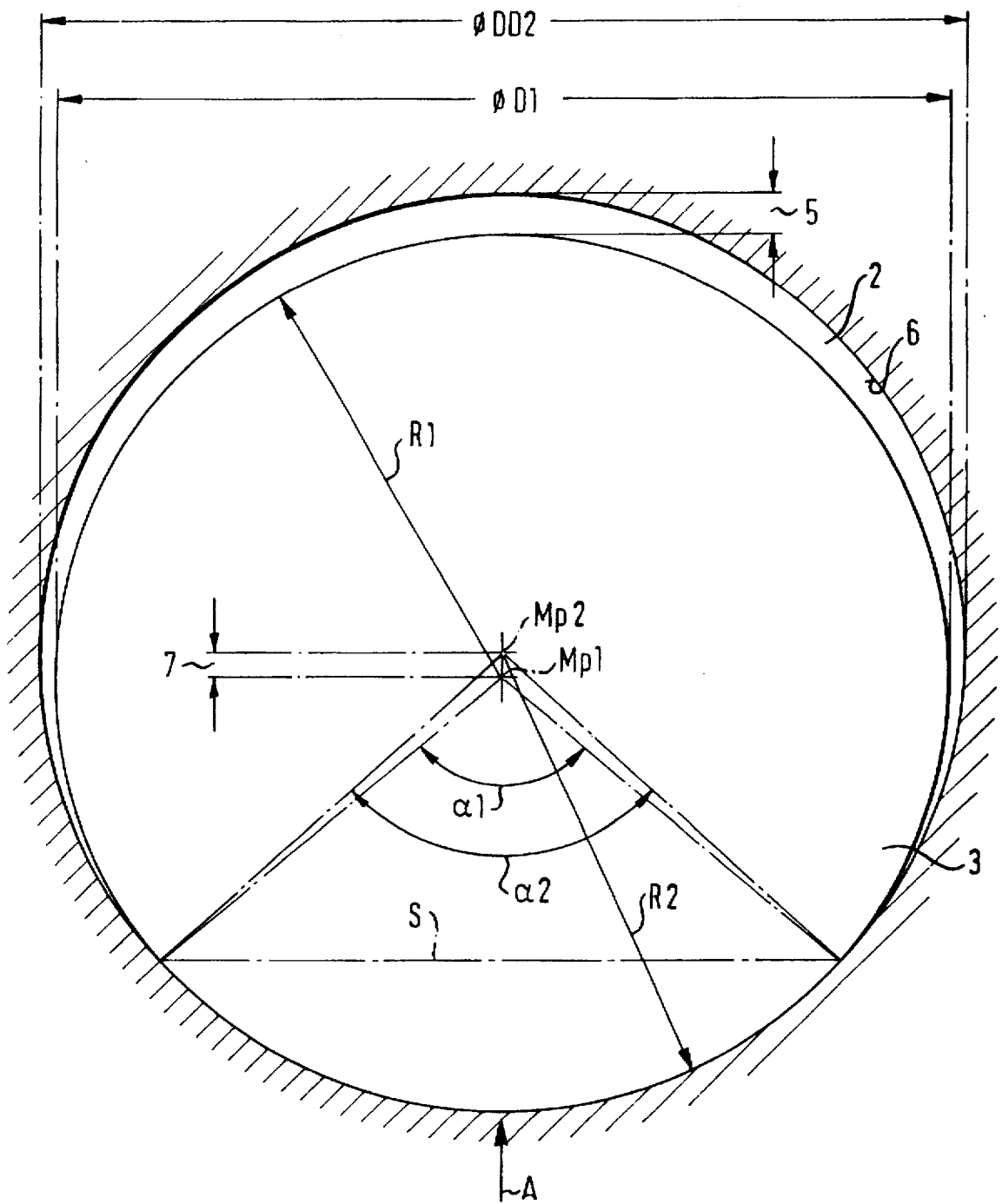
FIG. 3 is a representation of the bearing similar to FIG. 2.

The possible coordination of the radii of the stationary axle 3 with the radius of the bearing bore will be explained once again in the following by reference to FIG. 3. FIG. 3 shows a section through the stationary axle 3 and the inner wall 6 of the bearing bore 2 or of a bearing bush lining the same. In FIG. 3 the smaller radius R1 of the axle 3 determines the bearing play 5. The larger radius R2 corresponds to the radius of the inner wall 6 of the bearing bore. The center Mp1 is the central point of the axle and determines the bearing play 5 via radius R1. The angle α1 is the sector angle along the circumference of which the stationary axle 3 has the larger radius of curvature R2. Together with the length of the bearing, the angle α1 defines the bearing surface. The chord dimension S resulting from angle α1 defines the second center point Mp2 via the larger radius R2 and thus defines the angle α2. From the different angles α1 and α2 and from the lines through the center points Mp1 and Mp2, being parallel to the chord S, the difference measure 7 defining the bearing play 5 is obtained. Said difference measure 7 is dependent on the desired bearing surface as well as on the given bearing play.

What is claimed is:

1. A running wheel rotatably arranged on a stationary axle with bearing play, wherein the axle (3) has a circumferential section (4) defined by its sector with a sector angle of less than 180°, in which its radius of curvature is substantially equal to the radius of curvature (R) of the inner wall of the bearing bore, of the bearing bush or of the bearing shell of the running wheel, that the radius of curvature (r) of the remaining circumferential section of the axle (3) is smaller than the radius of curvature (R) of the bearing bore (2) or of the bore of the bearing shell in accordance with the desired bearing play (5), and that the main stress direction (A) acting upon the running wheel (1) lies in the section of the central plane of the axle sector with the larger radius (R).

2. The running wheel of claim 1, wherein the circumferential section of the axle (3) with the larger radius (R) corresponds to a sector angle of approximately 70° through 120°.

* * * * *